United States Patent
Hara et al.

(10) Patent No.: US 6,266,756 B1
(45) Date of Patent: *Jul. 24, 2001

(54) CENTRAL PROCESSING UNIT COMPATIBLE WITH BANK REGISTER CPU

(75) Inventors: Kazuhiko Hara, Sanda; Shinichi Yamaura, Kobe; Keiichi Yoshioka, Sanda; Keiji Nakamura, Takarazuka; Takao Katayama, Ikeda, all of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/682,003

(22) Filed: Jul. 16, 1996

(30) Foreign Application Priority Data

Jul. 17, 1995 (JP) .................................... 7-179972

(51) Int. Cl.[7] ........................................ G06F 12/00
(52) U.S. Cl. .............................. 711/220; 703/27
(58) Field of Search ..................... 711/220, 212, 711/214, 215, 5; 395/500.44, 500.47, 500.48, 500.49; 703/23, 26–28

(56) References Cited

U.S. PATENT DOCUMENTS

| | | | |
|---|---|---|---|
| 4,602,330 | * | 7/1986 | Ikeya ..................................... 364/200 |
| 4,679,140 | * | 7/1987 | Gotou et al. .......................... 364/200 |
| 5,151,993 | * | 9/1992 | Yamahata ............................. 395/775 |
| 5,511,173 | * | 4/1996 | Yamaura et al. ..................... 395/375 |
| 5,530,662 | * | 6/1996 | Ide ........................................ 364/736 |
| 5,623,697 | * | 4/1997 | Bland et al. .......................... 395/842 |
| 5,666,510 | * | 9/1997 | Mitsuishi et al. .................... 711/220 |
| 5,751,988 | * | 5/1998 | Fujimura .............................. 395/405 |

FOREIGN PATENT DOCUMENTS

| | | | |
|---|---|---|---|
| 51-132047 | 11/1976 | (JP) | .................. G06F/9/20 |
| 62-89294 | 4/1987 | (JP) | .................. G11C/8/00 |
| 191254 | 4/1989 | (JP) | .................. G06F/12/02 |
| 192851 | 4/1989 | (JP) | .................. G06F/12/02 |
| 3204029 | 9/1991 | (JP) | .................. G06F/9/34 |

* cited by examiner

Primary Examiner—Kevin Verbrugge
(74) Attorney, Agent, or Firm—Cooper & Dunham LLP (57) ABSTRACT

When data that does not fill a bit size (32 bits) of a first register is stored in the first register, 8-bit data is supplied from a second register or a first constant generator to unfilled higher 16 bit positions of the first register, and a second constant generator supplies 8-bit data to fill the remaining bit positions in the first register.

6 Claims, 7 Drawing Sheets

| MODE SIGNAL | | REGISTER SELECTION SIGNAL | SIZE SIGNAL | OUTPUT | | |
|---|---|---|---|---|---|---|
| M1 | M0 | | | SECOND REGISTER (DBR) | FIRST CONSTANT GENERATOR | SECOND CONSTANT GENERATOR |
| 0 | 0 | REGISTER 1B | 8,16BITS | DISABLED | ENABLED | ENABLED |
| 0 | 0 | OTHER THAN REGISTER 1B | | | | |
| 0 | 1 | REGISTER 1B | | | | |
| 0 | 1 | OTHER THAN REGISTER 1B | | | | |
| 1 | 0 | REGISTER 1B | | ENABLED | DISABLED | |
| 1 | 0 | OTHER THAN REGISTER 1B | | | | |
| 1 | 1 | REGISTER 1B | | | | |
| 1 | 1 | OTHER THAN REGISTER 1B | | | | |
| — | — | — | 32BITS | DISABLED | DISABLED | DISABLED |

CONTROL SIGNAL S1

FIG.4A

CONTROL SIGNAL S2

FIG.4B

CONTROL SIGNAL S3

CENTRAL PROCESSING UNIT COMPATIBLE WITH BANK REGISTER CPU

BACKGROUND OF THE INVENTION

1. Field of the Invention

The present invention relates to central processing units and more particularly to a central processing unit having a register of an expanded size and having addressing capability compatible with an lower-class central processing unit in which a bank register is used, by simulating addressing of the lower-class central processing unit.

2. Description of the Prior Art

An addressing scheme in which data is referred to by using a register as a pointer is called indirect addressing. When indirect addressing using a register (hereinafter, referred to as register indirect addressing) is performed in a central processing unit (hereinafter, referred to as a CPU) 1 equipped with a 16-bit general-purpose register $W_0$, addresses 0000h–FFFFh in a memory are accessible, that is, a memory area of 64 kbytes ($=2^{16}$) is available. Any address (for example, the address "1234h") has a 16-bit notation in this scheme. When such an address is stored in the above-mentioned 16-bit general purpose register $W_0$, addressing using the general purpose register $W_0$ as a pointer is made possible.

One of the methods for expanding an accessible area in a memory is known as a bank addressing. In bank addressing, lower bits of address data are stored in the general purpose register $W_0$, and higher bits of address data are stored in a data bank register DBR. According to this scheme, any address is represented using data in the data bank register DBR and data in the general purpose register $W_0$ (see Japanese Laid-Open Patent Applications No.64-91254, No.62-89294, No. 51-132047, No.1-92851 and No.3-204029).

A description will now be given of register indirect addressing using the bank addressing. It is assumed that an address having a size exceeding the size (16 bits) of the general purpose register $W_0$ is given. If we take an example of "123456h", the lower portion which fits the 16-bit notation, that is, "3456h" is stored in the 16-bit general purpose register $W_0$, and the higher 8-bit portion "12h" is stored in the data bank register DBR. A command may specify the general purpose register $W_0$ holding the lower 16-bit address portion while at the same causing the data bank register DBR to output the higher 8-bit data. Given that the data bank register DBR has a 8-bit capacity and the general purpose register Wo has a 16-bit capacity, a memory area representable by a 24-bit (8+16) notation is accessible. That is, a memory area as large 16 megabytes ($=2^{24}$) is available.

When the register indirect addressing is performed in a CPU 2 equipped with a 32-bit general-purpose register $W_1$, it is possible to access a memory area exceeding the 64-kilobyte limitation without using the data bank register DBR. That is, the aforementioned exemplary address "123456h" is stored as it is in the 32-bit general purpose register $W_1$ so that the bank register DBR is not necessary.

In case that the CPU 2 is an downward compatible model for the CPU 1, that is, in case the CPU 2 is capable of executing programs written for the CPU 1, but the CPU 1 is not necessarily capable of executing programs written for the CPU 2, the CPU 2 is expected to execute programs written for the CPU 1. Hence, the data bank register DBR is included in a programming model for the CPU 2. Accordingly, it is necessary for the CPU 2 to be adapted for register indirect addressing using the data bank register DBR.

It is conceivable that both the indirectly addressing using a 16-bit register and the indirect addressing using a 32-bit register are provided in the CPU 2. However, such an arrangement increases the number of indirect addressing schemes used, in proportion to the number of registers used (more specifically, a range of register IDs specified). An increase in the number of addressing schemes produces disadvantages such as an increase in a command code length and a decrease in the number of command types.

SUMMARY OF THE INVENTION

Accordingly, an object of the present invention is to provide a central processing unit in which the aforementioned problem is eliminated.

Another and more specific object of the present invention is to provide a central processing unit having a register of an expanded size and having addressing capability compatible with an lower-class central processing unit in which a bank register is used, by simulating addressing of the lower-class central processing unit.

Assuming that the CPU 2 having a 32-bit register processes a program written for the higher-class CPU wherein 16-bit data is written in the 32-bit register, the higher 16 bits are meaningless. The entirety of the 32-bit data in the 32-bit register is not read. That is, even when the lower 16-bit data is rewritten, the 32-bit register is not used in register indirect addressing.

Rewriting of 16-bit data also occurs when the CPU 2 having a 32-bit register processes a program written for the lower-class CPU. In this case, the 32-bit register in which the 16-bit data is rewritten may be used in register indirect addressing. Indirect register addressing in such a case is a process of adding data in a data bank register (DBR) to the 16-bit data in the 32-bit register. The data in the data bank register may be referred to as a fixed value because once set this data is held fixed. In this adding process, the data in the data bank register is copied to the higher 16-bit area in the 32-bit register. The resultant 32-bit data in the 32-bit register may be delivered to a subsequent process.

The central processing unit of the present invention comprises a first register and a second register having a smaller bit size than the first register. Storing in the first register of data not as long as the bit length of the first register is performed such that 16-bit data, for example, is forwarded from the second register to the bit positions in the first register not filled (i.e. the higher 16 bit positions).

A description will now be given of how register indirect addressing is implemented when a program for the higher-class CPU is executed. When 32-bit data is written in the first register, the 32-bit data is output as an address. When 16-bit data is written in the first register, another 16-bit data is forwarded from the second register to the higher portion of the first register, resulting in 32-bit data obtained as a result of expanding the 16-bit data. Accordingly, a lower-class CPU program that causes 16-bit data to be stored in the first register may employ the same register indirect addressing scheme as used for the 32-bit data.

The process of supplying 16-bit data, for example, from the second register to the unfilled higher 16 bit positions of the first register may be executed using one command.

More specifically, when the data in the second register is modified, the data that reside in the higher portion of the first register and corresponds to the data in the second register should also be modified. However, with the use of a normal command, the content of the bank register (corresponding to the second register) is transferred to the lower portion of the general-purpose register (corresponding to the first register), thus requiring a shift operation in the general-purpose register after the data is transferred to the lower portion. Hence, two commands are required. It is desirable that the same process be executed using one command. For example, by connecting the input points of the higher 16-bit portion of the first register to the output points of the second register, and by providing a command for reading the data in the first register and adding 0s to the read data, and for transferring the result of addition to the first register, it is possible to have the content of the second register automatically appended to the result of addition and stored in the higher 16-bit portion of the first register.

It is also possible to configure the second register to have an 8-bit size and to provide a constant generator for supplying a specific constant (for example, 0) to the remaining 8 bit positions in the higher portion. According to this arrangement, it is not necessary for the second register to have a 16-bit size.

In another preferred embodiment, a mode flag may be used to determine whether the data (fixed value) is supplied from the second register to the unfilled higher portion (higher 16 bit positions) of the first register or a constant is supplied from the constant generator (hereinafter, referred to as a first constant generator) for generating a constant like 0.

The above-described arrangement is conceived in consideration of the fact that the process started by the mode flag may be different from one application program (written to be executed by the lower-class CPU) to another. The mode flag may cause an arbitrary fixed value to be placed (added) as higher-bit values at the head of the lower 16 bits. Alternatively, the mode flag may cause a constant such as 0 to be placed in the higher portions. In the case of the lower-class CPU, the final address may be generated at the last moment when the address is to be output.

In the CPU according to the present invention, an arbitrary fixed value or a constant is input in the higher portion parallel to a transfer process for transferring the lower 16-bit data to the first register. It is undesirable to rewrite the fixed value in the second register to change it into a constant because it is difficult for a program to control such a complicated process. Accordingly, the second register and the first constant generator are provided so that a selection between the two is made in the transfer operation, the selection being effected by the mode flag. With this arrangement, the second register is only required to store a fixed value. There is no need to rewrite the content of the second register to change a fixed value into a constant.

Assuming that the second register has an 8-bit size and the first constant generator has an 8-bit size, these 8-bit sizes do not fill the higher 16 bit positions. Therefore, a constant generator (hereinafter, referred to as a second constant generator) for supplying a specific constant such as 0 to the remaining 8 bit positions may be provided.

The first register may be comprised of a plurality of registers so that a specific one of the plurality of registers may be differently configured compared to the other registers in that selection pattern for selecting a fixed value or a constant by the mode flag is opposite to the selection pattern for the other registers.

The above arrangement is conceived in consideration of a register usage rule provided in a CPU. A register usage rule may require that some registers be used in different manners than the others. For example, a constant, instead of a fixed value, may have to be set in the higher bit positions in designated registers because register indirect addressing is not enabled in those particular registers. The present invention is capable of adapting to such a register usage rule.

Alternatively, a command may be used to select a target register for data transfer process. For example, assuming that the first register is comprised of four registers, four-bit data in the command may provide select particular registers which are a target for data transfer process by assigning 0 to a "nontarget" register and 1 to a "target" register.

In this way, it is possible to specify any one register out of a plurality of registers constituting the first register, using one command. Data in the bit positions that correspond to a bank address may be designated as a bank address value.

The second register may be used to hold a bank address for use in direct addressing (absolute addressing).

According to direct addressing using the above approach, the bank method, in which data in a bank register is appended at the head of a specified address so as to generate a target address, can be executed without any additional bank registers. That is, the second register may be used as the bank register in direct addressing.

In the construction in which the second register is used to hold the bank address for direct (absolute) addressing, the mode flag may be used to select between data from the second register and data from the first constant generator for generating a constant such as 0. Further, this selection pattern may be identical to the selection pattern for transferring selected data to the first register in indirect addressing.

In the above-described direct addressing, the mode flag selects between the second register and the first constant generator. Because of this arrangement, it is not necessary to change data in the second register into a constant. Further, since the same selection pattern is employed when the bank address is generated and when selected data is stored in the first register, the same bank value occurs in indirect addressing and in direct addressing.

In another preferred embodiment, data transfer process for supplying data (fixed value) from the second register to the unfilled bit positions in the first register may be executed only when an operation of a specific bit size is carried out. Assuming that the first register has a 32-bit size, the higher bit positions remain blank, if an operation is of an 8-bit data size or a 16-bit data size. Assuming that the operation of a 16-bit data size requires a fixed value and the operation of an 8-bit data size doesn't, a value from a previous operation can remain in the higher bit positions in the operation of an 8-bit data size.

In the above operation of an 8-bit data size, only the 8-bit portion in the lower 16 bit portion is utilized, resulting in an inefficient use of the register. In such a case, the lower 16-bit portion of the first register may be divided into two 8-bit portions so that the first register apparently has two 8-bit registers. In this way, the register can be used efficiently.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

A description will now be given of a first embodiment of the present invention.

Figure 1:
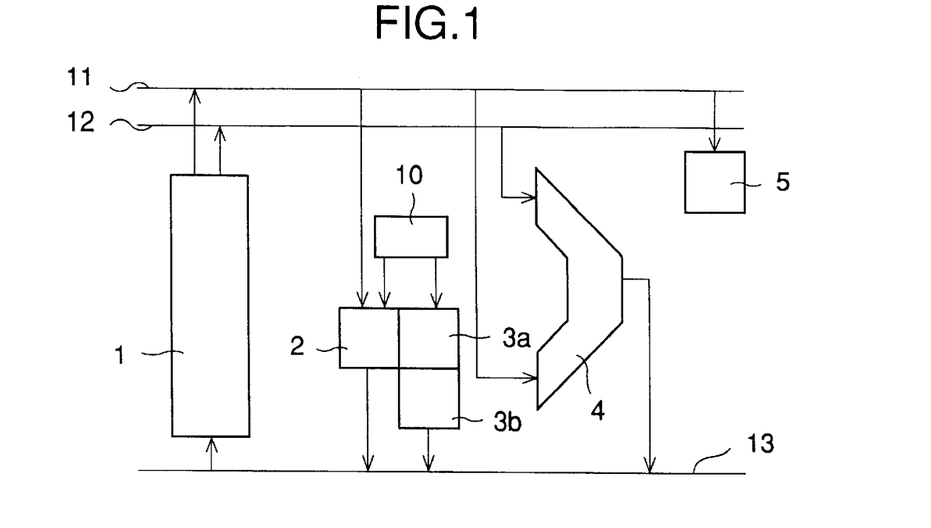
FIG. 1 is a schematic diagram showing a construction of a central processing unit according to the present invention.

FIG. 1 is a schematic circuit diagram of a central processing unit according to the present invention. A general-purpose register (first register) 1 has a width of 32 bits. The general-purpose register 1 receives data C via a data bus 13 and outputs data A and B via a data buses 11 and 12, respectively. A second register 2 has a width of 8 bits. The second register 2 receives data A via the data bus 11 and outputs data C via the data bus 13. A first constant generator 3a and a second constant generator 3b have an 8-bit size and generates a constant such as "00000000" to be output to the data bus 13. The second register 2, and the first and second constant generators 3a and 3b are controlled by a data filling controller 10. An operator 4 is a 32-bit arithmetic and logic unit. The operator 4 executes an operation on an input of data A supplied via the data bus 11 and data B supplied via the data bus 12, and outputs a result to the data bus 13. A processor status register 5 receives an input of data A via the data bus 11 and sets a mode flag described later. A description of each of the constituting elements will now be given.

Figure 2:
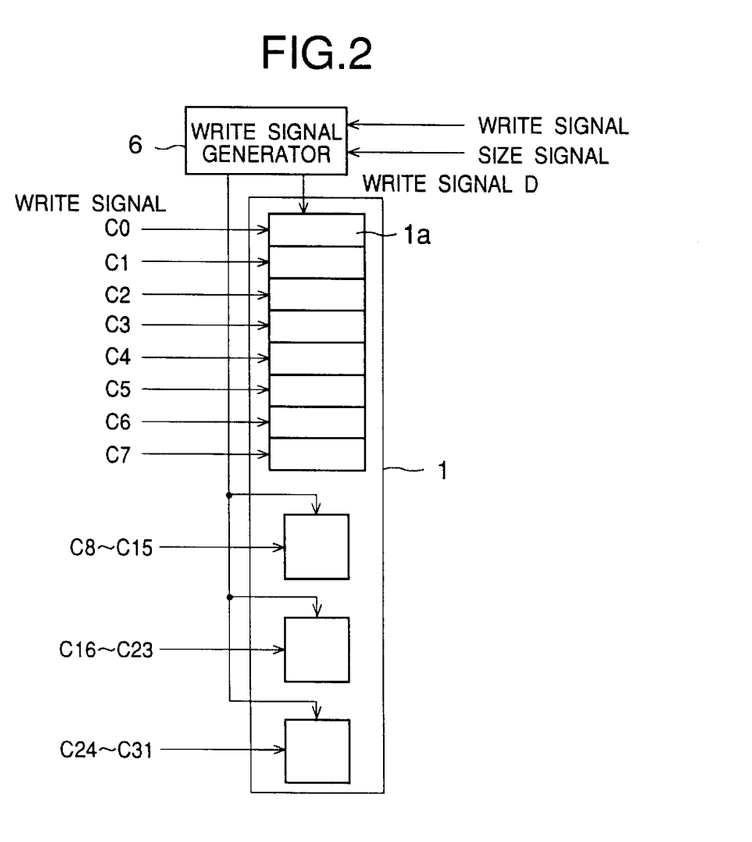
FIG. 2 is a block diagram showing a general-purpose register and a write signal generator according to the present invention.

FIG. 2 is a circuit diagram showing the general-purpose register 1 and a write signal generator 6 for controlling the general-purpose register 1, illustration of how data is output being omitted. The reference numeral 1a indicates a part (one bit) of the general-purpose register 1. The general-purpose register 1 receives data C composed of bits C0–C31 from the data bus 13. A write signal D and a write signal E cause specified bits in the data C to be written in the general-purpose register 1. The write signal generator 6 receives a write signal and a size signal so as to control generation of the write signals D and E based on the write signal and the size signal. The write signal D controls writing of the lower 8 bits (C0–C7), and the write signal E controls writing of the higher 24 bits (C8–C31). A selection is made between writing in the 0–7 bit positions (lower 8 bit positions) in the general-purpose register 1 and writing in the 0–31 bit positions (entire 32-bit positions) in the general-purpose register 1, using the write signals D and E.

In practice, a plurality of general-purpose registers 1, instead of one general-purpose register 1, are normally used. A description of a configuration in which a plurality of general-purpose registers are provided will be given with reference to FIG. 7.

Figure 3:
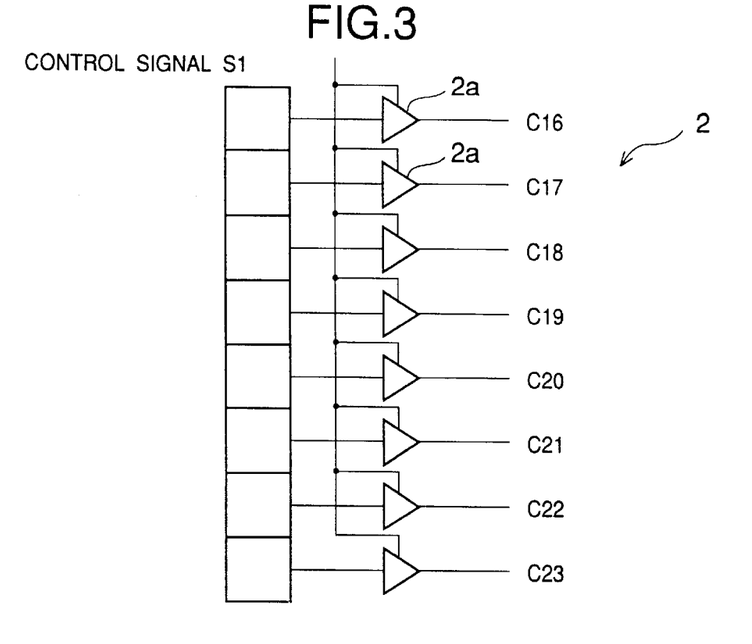
FIG. 3 is a circuit diagram showing a second register according to the present invention.

FIG. 3 is a circuit diagram of the second register 2. Illustration of how data is input is omitted. The second register 2 is provided with a series of three-state buffers 2a serially connected in the respective data lines. A control signal S1 is supplied from the data filling controller 10 to each of the three-state buffers 2a so that a selection between an output of data and a non-output of data is made. Data bits C16–C23 of the data C from the second register 2 are output to the respective data lines that carry bits 16–23 in the data bus 13. More specifically, the general-purpose register 1 has its input ports, which correspond to the data bits C16–C23 of the higher 16 bits, directly connected to the output ports of the second register that supply the data bits C16–C23.

Figure 4A:
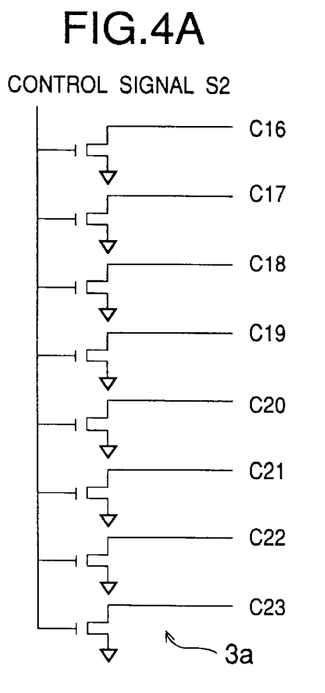
FIG. 4A is a schematic diagram showing a first constant generator according to the present invention.
Figure 4B:
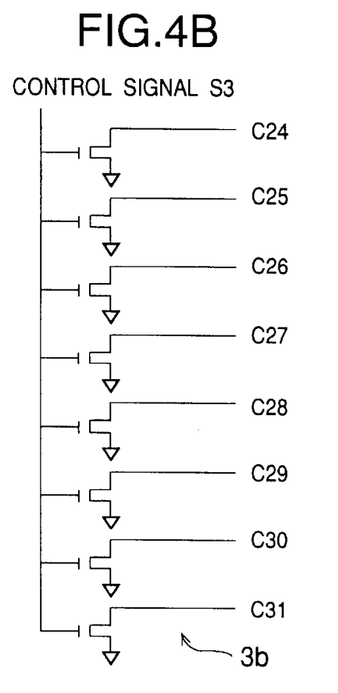
FIG. 4B is a schematic diagram showing a second constant generator according to the present invention.

FIG. 4A is a circuit diagram showing the first constant generator 3a. FIG. 4B is a circuit diagram showing the second constant generator 3b. The first constant generator 3a outputs a constant such as "00000000" in the form of the data bits C16–C23 via the respective data lines carrying bits 16–23 of the data bus 13. The second constant generator 3b outputs a constant such as "00000000" in the form of data bits C24–C31 via the respective data lines carrying bits 24–31 of the data bus 13. Control signals S2 and S3 from the data filling controller 10 are responsible for controlling the output of the constant. The first constant generator 3a ensures that the bits 16–23 of the data bus 13 (the higher 8-bit portion of the 16-bit output of the operator 4) are filled by an arbitrary fixed value or a constant such as "0", by selection. The second constant generator 3b ensures that the second register 2 may be embodied by a 8-bit register instead of the 16-bit register.

Figure 5:
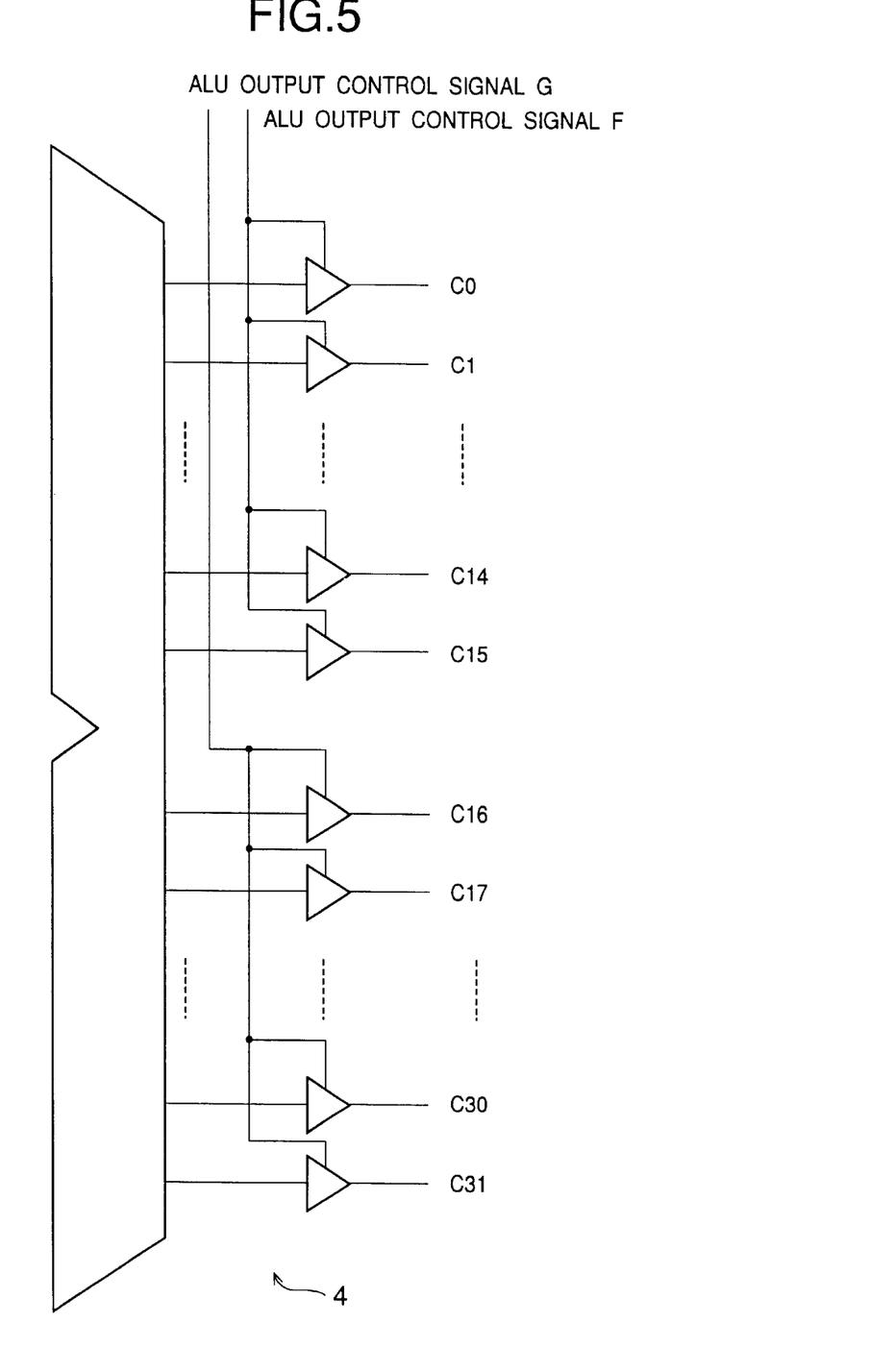
FIG. 5 is a schematic diagram showing a an operator according to the present invention.

FIG. 5 is a circuit diagram of the operator 4. Illustration of how data is input is omitted. The operator 4 outputs a result of operation in the form of data bits C0–C31 on the data bus 13. An output control signal F causes the data bits C0–C15 to be output, and an output control signal G causes the data bits C16–C31 to be output. As a result, output of the operator 4 is switchable to provide the lower 16 bits (the data bits C0–C15) or the entire 32 bits (the data bits C0–C31).

Figure 6:
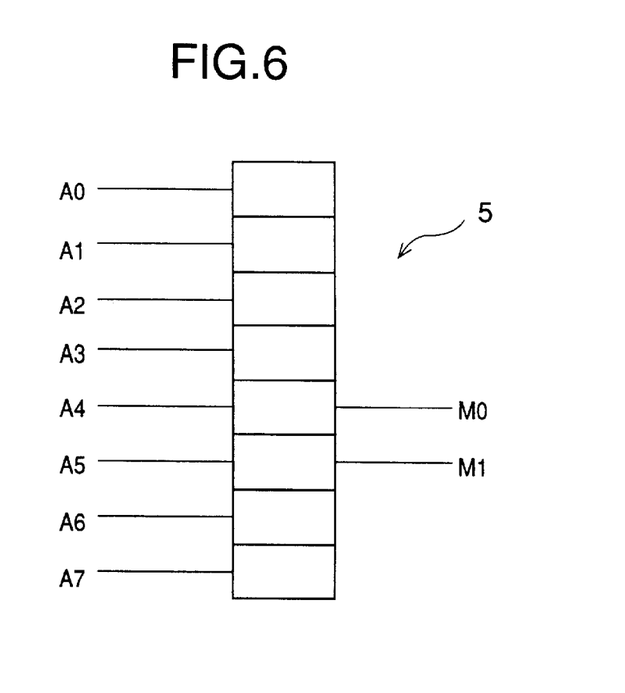
FIG. 6 is a schematic diagram showing a a processor status register according to the present invention.

FIG. 6 is a circuit diagram showing the processor status register 5. The processor status register 5 receives data bits A0–A7 via the data bus 11 and outputs data M0 and data M1. The data M0 and the data M1 are output signals that correspond to data bits A4 and A5, respectively. The data M0 and the data M1 will be referred to as mode flags M0 and M1.

Figure 7:
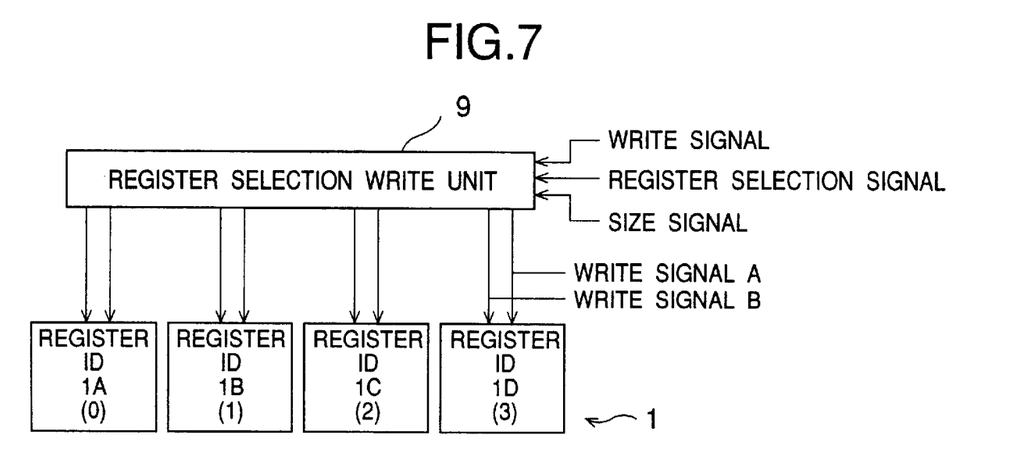
FIG. 7 is a schematic diagram showing a first register comprised of a plurality of registers, and a unit for controlling the registers.

FIG. 7 is a circuit diagram showing four general-purpose registers 1A–1D and a register selection write unit 9. The register selection write unit 9 receives a write signal, a register selection signal (a signal designating one of the general-purpose registers 1A–1D) and a size signal (a signal specifying a distinction between 8 bits, 16 bits and 32 bits). The register selection write unit 9 outputs the write signals D and E (described with reference to FIG. 2) to the selected general-purpose register.

Figure 8:
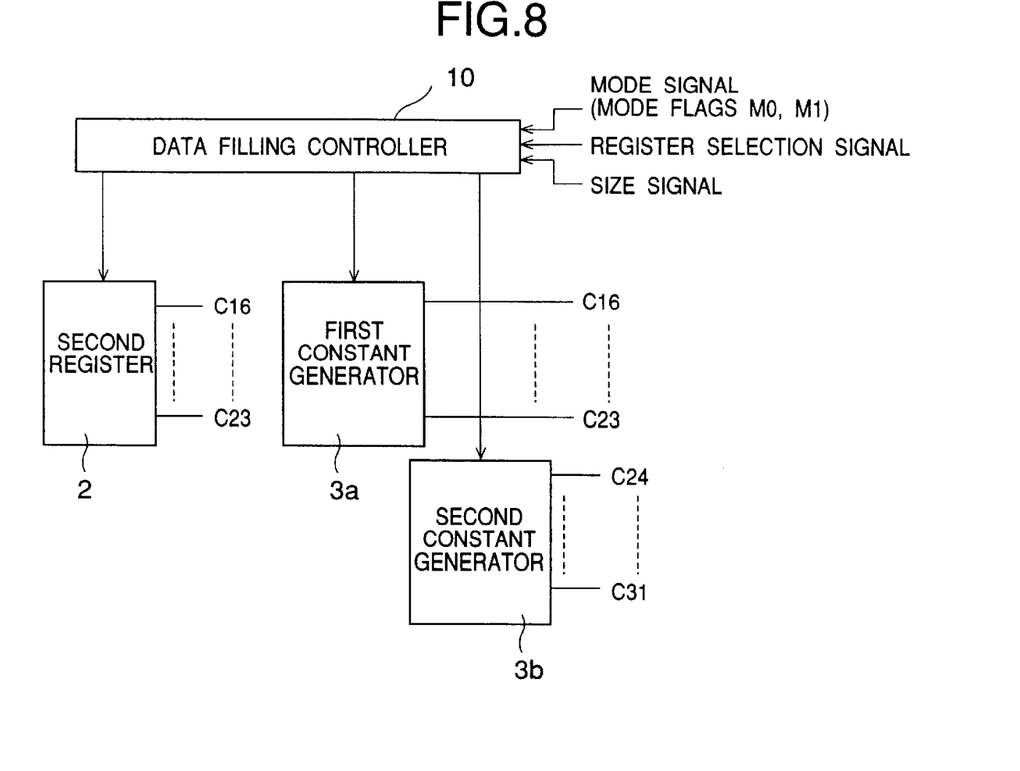
FIG. 8 is a schematic diagram showing a data filling controller according to the present invention connected to the second register, and the first and second constant generators.

FIG. 8 is a circuit diagram showing how the data filling controller 10 is connected to the second register 2, and the first and second constant generators 3a and 3b. The data filling controller 10 receives the mode flags M0 and M1, the register selection signal (also described with reference to FIG. 7), and the size signal (also described with reference to FIG. 7). The data filling controller 10 controls the second register 2, and the first and second constant generators 3a and 3b. A specific manner in which the data filling controller 10 effects control will be described later.

A description will now be given of the operation of the central processing unit. Specifically, the description of how an operation result of the operator 4 is stored in the general-purpose register 1 will be given.

The process of transferring the entirety of the 32-bit operation result (the data bits C1–C31) of the operator 4 is executed as follows. As described before, an output width of the operator 4 is determined by the output control signals F and G. The output control signals F and G may be set to select all the 32 bits to be output from the operator 4. Associated with this, the write signals D and E are set to cause all the 32 bits C1–C31 to be written in the corresponding bit positions 0–31 in the general-purpose register 1 via the data bus 13.

When the lower 8 bits (the data bits C0–C7) of the operation result from the operator 4 are transferred to the general-purpose register 1, the lower 16 bits (the data bits C0–C15) from operator 4 are selected by setting the output control signals F and G appropriately. Associated with this, the write signals D and E are set so that the lower 8 bits (the data bits C0–C7) are written in the general-purpose register 1. As a result of this arrangement, the lower 8 bits of the operation result are input to the bit positions 0–7 in the general-purpose register 1 via the data bus 13. No data is written in the bit positions 8–31 in the general-purpose register 1.

Transferring of the lower 8 bits (the data bits C0–C7) of the operation result from the operator 4 means storing of data that fails to fill the data size of the general-purpose register 1. However, it is to be appreciated that the first embodiment ensures that, in the lower 8-bit transfer from the operator 4, data in the second register is not transferred to the general-purpose register 1.

When the lower 16 bits (the data bits C0–C15) of the operation result from the operator 4 are transferred to the general-purpose register 1, the output control signals F and G are appropriately set to select the lower 16 bits (the data bits C0–C15) in the operator 4. In contrast to the case of the lower 8-bit transfer, the write signals D and B are used so that the entire 32 bits (the data bits C0–C31) are written in the general-purpose register 1. The control signals S1 and S2 are used to determine whether the data bits C16–C23 are output from the second register 2 or the data bits C16–C23 are output from the first constant generator 3a. The control signal S3 causes the data bits C24–C31 to be output from the second constant generator 3b. As a result, the operation result of the operator 4 is stored in the general-purpose register 1 as the data bits C0–C15, and the data in the second constant generator 3b and the selected one of the second register 2 and the first constant generator 3a is stored in the general-purpose register 1 as the data bits C16–C31.

Figure 9:
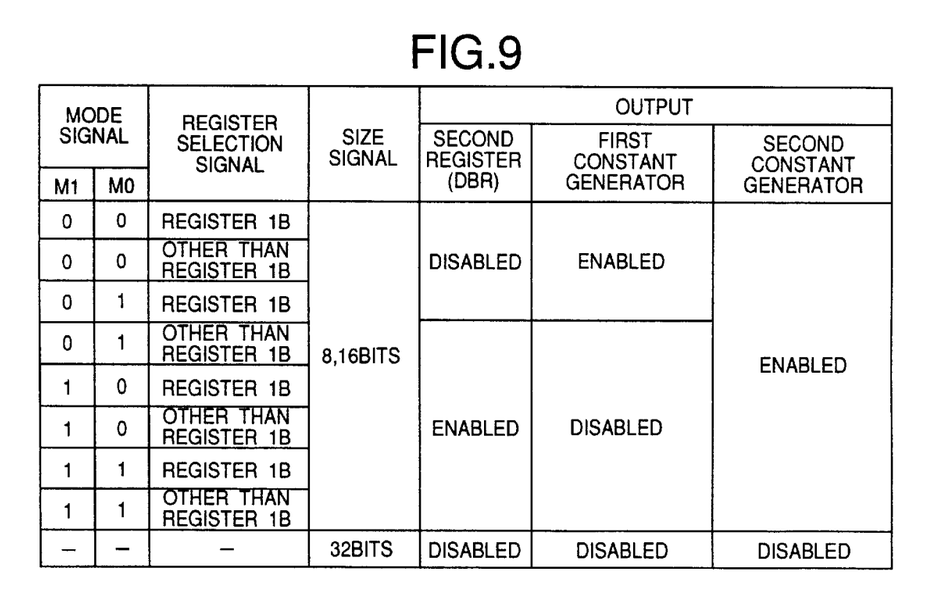
FIG. 9 is a diagram which explains an operation of the data filling controller of FIG. 8.

The control signals S1, S2 and S3 are output from the data filling controller 10 based on the mode flags M0 and M1, the register selection signal and the size signal. FIG. 9 shows how the outputs of the second register, the first constant generator and the second constant generator are enabled or disabled based on the mode flags M0 and M1, the register selection signal and the size signal, enabling and disabling being effected actually by the control signals S1, S2 and S3.

Whether or not given data fills the 32-bit length of the general-purpose register 1 is determined based on the size signal. When the 16-bit data is stored in the general-purpose register 1, the 8-bit data bits C16–C23 are output from the second register 2 to the unfilled higher 16 bit positions in the general-purpose register 1. The process for storing the data bits C16–C23 from the second register 2 in the higher 16 bit positions (the bit positions 16–23) of the general-purpose register 1 may be executed at the same time as the process for storing data in the lower 16 bit positions in the general-purpose register 1. The 8 bit positions (for the data bits C16–C23) of the higher 16-bit portion of the general-purpose register 1 are connected to the output of the second register 2. Therefore, generation of the write signal, and transfer of the data in the second register 2 or the first constant generator 3a to the general-purpose register 1 can be executed using one command.

Different modes of selecting the data from the second register 2 (indicated in FIG. 9 as the DBR) and the first constant generator 3a, using the mode flags M0 and M1, may be applied to a plurality of general-purpose registers 1A–1D. FIG. 9 shows that the selection mode applied to the general-purpose register 1B is different from that applied to the general-purpose registers 1A, 1C and 1D.

More specifically, when the flags M0 and M1 are 0 and 1, respectively, the general-purpose register 1B is supplied with the data from the first constant generator 3a instead of the second register 2, and the general-purpose registers 1A, 1C and 1D are supplied with the data from the second register 2 instead of the first constant generator 3a. Such an arrangement ensures that a register usage rule that stipulates different usage for a plurality of registers is satisfied.

As has been described, this embodiment ensures that 32-bit data is always stored in the general-purpose register 1 as 32-bit data. 8-bit data is always stored in the general-purpose register 1 as 8-bit data. 16-bit data is always stored in the general-purpose register 1 as 32-bit data with the higher 16-bit portion derived from expansion. The expanded portion contains the content of the second register 2 (bank register) or the constant such as "00h". The content in the expanded portion depends on how the mode flag is set and on the registers as identified by the register ID. For this reason, the same process as applied to the 32-bit process can be applied to the indirect addressing in which the 16-bit data is utilized.

A description will now be given of a second embodiment of the present invention. In the second embodiment, the data in the second register 2 can be used as bank data in direct addressing. Direct addressing is a type of addressing in which an address for use in an access to an operand placed in an external memory is directly written in a program. For example, in the case of a central processing unit having a 24-bit address area, the lower 16-bit address may be directly specified by a program and the higher 8-bit address may be specified by using the content of the DBR. In order for the higher-class CPU of the present invention to execute such a process, the mode flags M0 and M1 are employed to specify whether the content (fixed value) of the second register functioning as a data bank register embodies the higher 8 bits of the address or the constant (for example, "00h") in the first constant generator 3a does. The selection pattern for selecting the fixed value or the constant using the mode flags M0 and M1 in direct addressing is configured to be the same as the selection pattern (see FIG. 9) which is used to select the data to be transferred to the general-purpose register 1 in the indirect addressing.

The use of the mode flags to select the second register 2 or the first constant generator 3a in the direct addressing ensures that it is not necessary to rewrite data in the second register every time the constant instead of the fixed value is used. Further, since the same selection pattern is employed in generating the bank data and in storing data in the general-purpose register 1, the same bank value occurs in the indirect addressing and in the direct addressing.

A description will now be given of a third embodiment of the present invention.

In the first embodiment, a description was given of how data in the second register 2 is placed in the unfilled bit positions in the general-purpose register 1. Placing of the content of the second register 2 may be configured to occur only in specific cases including a 16-bit size operation.

The higher portion of the general-purpose register 1 having a 32-bit size remains unfilled when an operation has a data size of 8 bits or 16 bits (other sizes are possible). Only the operation having one of the two sizes may require a fixed value as higher-portion data. For example, an address operation that requires a fixed value has a data size of 16 bits only.

If an operation is other than the address operation and does not require a fixed value, a value from a previous calculation may remain in the higher bit positions in the general-purpose register 1 and is not replaced by the data from the second register 2. In this way, it is possible to use the previous value.

It is also to be noted that using only the lower 8 bits in the general-purpose register 1 having a 32-bit size is not efficient. Therefore, it is desirable that the lower 16 bits in the general-purpose register 1 be used as two individual 8-bit registers.

Figure 10:
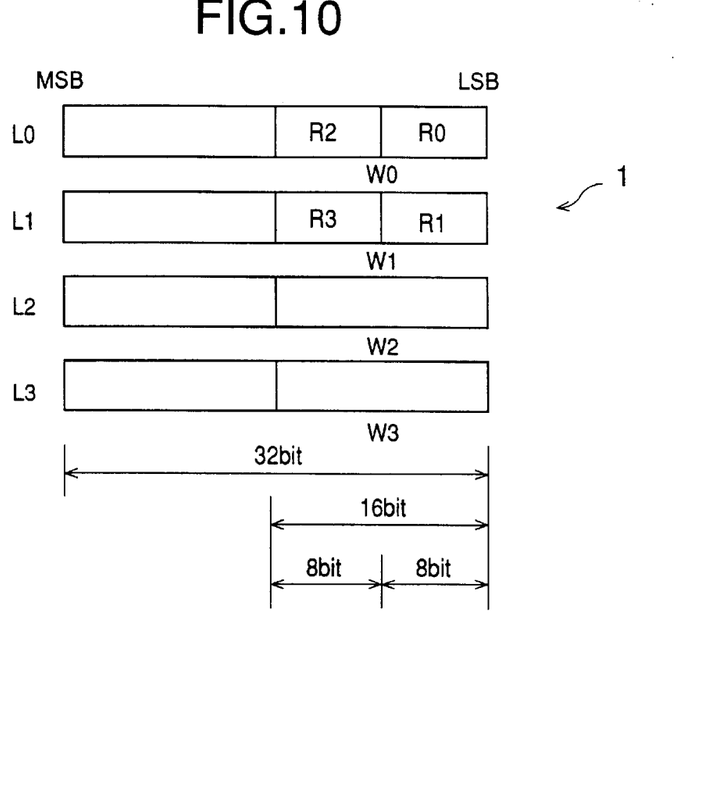
FIG. 10 is a diagram which explains how the first register according to the present invention may be divided.

FIG. 10 shows a case where four registers L0–L3 are provided to constitute the general-purpose register 1. A 16-bit portion W0 of the register L0 is divided into two register portions R0 and R2, and a 16-bit portion W1 of the register L1 is divided into two register portions R1 and R3.

Figure 11:
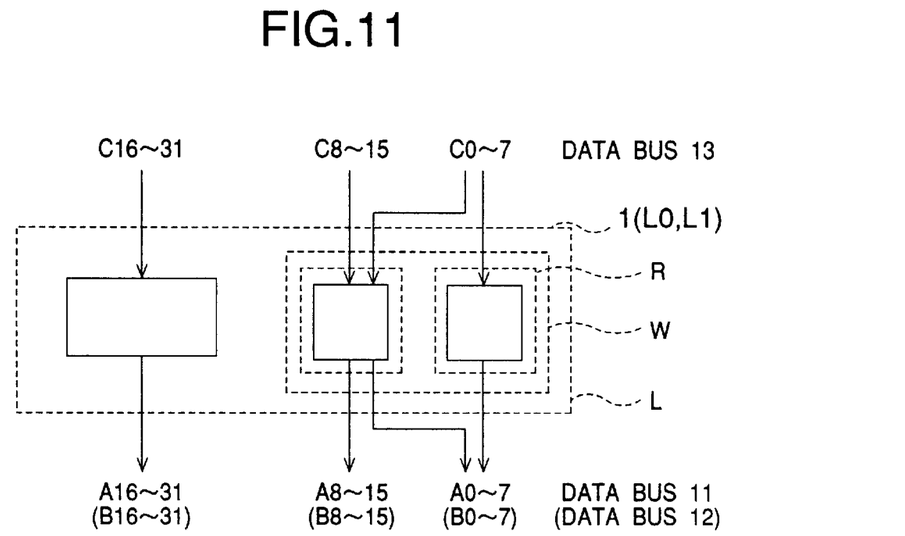
FIG. 11 is a schematic diagram showing how a register divided as shown in FIG. 10 is operated.

FIG. 11 is a circuit diagram showing how the 8-bit register portions R0 and R1 to function as individual 8-bit registers. As can be seen from the figure, the data bits C0–C7 in the bit positions 0–7 of the data bus 13 are written in the 8-bit register portions R0 and R2 (or R1 and R3). The output of the 8-bit register portions R0 and R2 (or R1 and R3) is provided as data bits A0–A7 (or B0–B7) on bit positions 0–7 of the data bus 11 (or 12).

Thus, the general-purpose register 1 can be used efficiently by dividing the lower 16 bit portion of the general-purpose register 1 when the totality of the 32 bits are not used.

A description will now be given of a fourth embodiment of the present invention.

In the fourth embodiment, the central processing unit has an update command for setting the data in the second register 2 in the unfilled bit positions in the general-purpose register 1 when an operation for storing data that does not fill the data length of the general-purpose register 1 is carried out. An occurrence and a content of the update is determined by the mode flags M0 and M1 set by the processor status register (PSR) 5. When the general-purpose register 1 is comprised of a plurality of registers, the update may be dependent on the register ID specified. For example, as described in the first embodiment, the register 1B may be differently configured from the other registers 1A, 1C and 1D.

Figure 12:
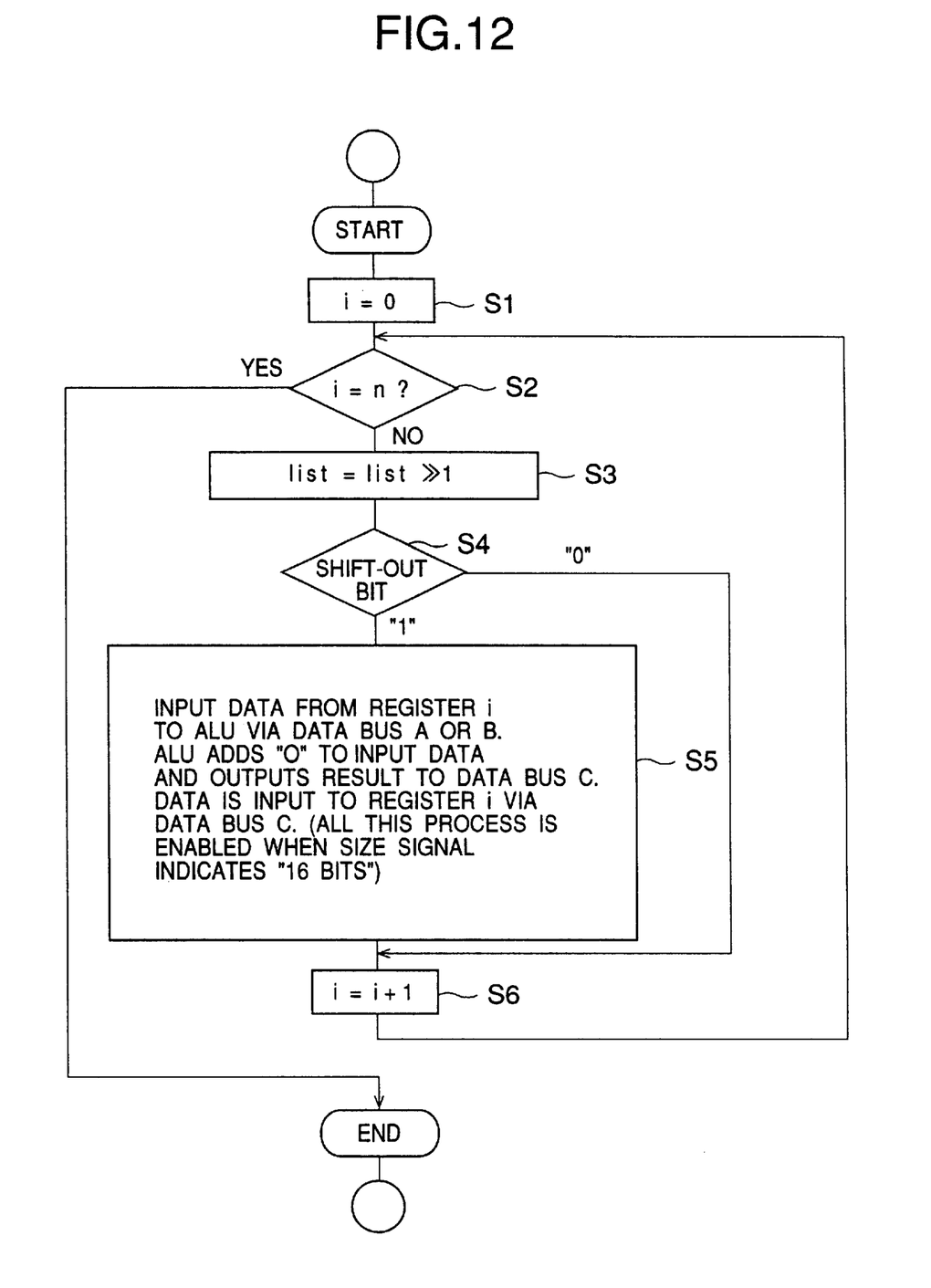
FIG. 12 is a flowchart showing an operation flow initiated by a command according to the present invention.

FIG. 12 is a flowchart showing a process initiated by an update command issued in the construction in which the general-purpose register 1 is comprised of a total of n registers. First, an initial process for setting i to 0 is conducted (step 1), where i is a number that corresponds to the register ID processed. Then, a determination is made as to whether or not i=n (step 2). That is, a determination is made as to whether or not all the registers have been processed. If i=n, the operation flow of FIG. 12 is terminated. If i is not equal to n, a process list=list>>1 is conducted (step 3).

"list" is information provided by the update command and indicates whether an update is required in each register. If n=4, "list" is constructed of 4 bits. The 0th bit in the four-bit "list" information is made to correspond to the 0th register, the 1st bit is made to correspond to the 1st register and so on. Bit "0" indicates a non-update, and bit "1" indicates an update. In the process list=list>>1, the 4-bit "list" information is right-shifted by one bit.

A determination is then made as to whether a shift-out bit is "0" or "1" (step 4). Step 4 is a step for determining whether or not the update in the ith register is to be performed.

When the shift-out bits is "1", the update in the ith register 1 is conducted (step 5). In this update process, data in the ith register is input to the operator 4 via the data bus 11 or the data bus 12. The operator 4 adds the data to "0" and outputs the addition result to the data bus 13. In this process, the size signal is set to indicate a 16-bit size. Accordingly, the data bits C16–C23 of the data bus 13 are embodied by the content of the second register 2 or the first constant generator 3a, and the data bits C24–C31 are embodied by the content of the second constant generator 3b. As a result, the update of the ith register is completed. Specific manners in which the update process is conducted are listed in FIG. 9 described previously.

When the shift-out bit is "0", no update process is conducted in the ith register, and the operation flow proceeds to step 6, wherein a process i=i+1 is conducted so that the next register is processed. The operation flow then proceeds to step 2. When as many number of processes as the number of registers are completed, a determination i=n is made in step 2, whereupon the operation flow is terminated.

The present invention is not limited to the above described embodiments, and variations and modification may be made without departing from the scope of the present invention.

What is claimed is:

1. A central processing unit comprising:
   a first register used as a general purpose register for storing a first amount of data and not for a program counter register, the first amount of data obtained as a result of an operation performed by an ALU in response to an instruction requesting the operation to be performed;
   a second register for storing a second amount of data;
   a first constant generator used exclusively for generating and holding constant data where said constant data need not be generated at the time of initializing said central processing unit;
   a status register for generating mode flags; and
   a data filling controller connected to said second register, said first constant generator and said status register for controlling a supply of data to said first register via a data bus, wherein
   when said first amount of data does not fill said first register, said mode flags are set by said status register and signal said data filling controller to select one of said second register and said first constant generator to supply data to said first register to fill at least some of the unfilled bit positions.

2. The central processing unit as claimed in claim 1, wherein said first register is comprised of a plurality of registers, and the mode flags for causing selected one of said second register and said first constant generator to supply data are set differently for predetermined one of said plurality of registers than for the other registers.

3. The central processing unit as claimed in claim 1, wherein data in said second register is used as a bank address in direct addressing, and said mode flags causes selected one of said second register and said first constant generator to supply a bank value to said first register, a selection pattern of said mode flags being the same as a selection pattern used in storing data in said first register.

4. A central processing unit comprising:

a first register used as a general purpose register for storing a first amount of data and not for a program counter register, the first amount of data obtained as a result of an operation performed by an ALU in response to an instruction requesting the operation to be performed;

a second register for storing a second amount of data;

a first constant generator used exclusively for generating and holding a constant where said constant need not be generated at the time of initializing said central processing unit; and a data filling controller connected to said second register and said first constant generator for controlling a supply of data to said first register via a data bus, wherein when said first amount of data does not fill said first register, said data filling controller instructs said second register to supply data to fill at least some of the unfilled bit positions in said first register, and instructs said first constant generator to supply data to bit positions in said first register not filled by the data from said second register to fill at least some of the unfilled hit positions.

5. A central processing method comprising:

storing a first amount of data in a first register used as a general purpose register and not for a program counter register, the first amount of data obtained as a result of an operation performed by an ALU in response to an instruction requesting the operation to be performed;

storing a second amount of data in a second register;

generating and holding constant data using a first constant generator used exclusively for generating and holding constant data where said constant data need not be generated at the time of initializing said central processing unit;

generating mode flags using a status register; and controlling a supply of data to said first register via a data bus using a data filling controller, wherein when said first amount of data does not fill said first register, said mode flags are set by said status register and signal said data filling controller to select one of said second register and said first constant generator to supply data to said first register to fill at least some of the unfilled bit positions.

6. A central processing method comprising:

storing a first amount of data in a first register used as a general purpose register and not for a program counter register, the first amount of data obtained as a result of an operation performed by an ALU in response to an instruction requesting the operation to be performed;

storing a second amount of data in a second register;

generating and holding a constant using a constant generator used exclusively for generating and holding constant data where said constant need not be generated at the time of initializing said central processing unit; and controlling a supply of data to said first register via a data bus using a data filling controller, wherein when said first amount of data does not fill said first register, said data filling controller instructs said second register to supply data to fill at least some of the unfilled bit positions in said first register, and instructs said second constant generator to supply data to bit positions in said first register not filled by the data from said second register to fill at least some of the unfilled bit positions.

* * * * *